(12) United States Patent
Lee et al.

(10) Patent No.: US 8,253,378 B2
(45) Date of Patent: Aug. 28, 2012

(54) BATTERY MANAGEMENT SYSTEM WITH INTEGRATION OF VOLTAGE SENSOR AND CHARGE EQUALIZER

(75) Inventors: Joong Hui Lee, Daejeon (KR); Soo Yeup Jang, Daejeon (KR); Jeon Keun Oh, Daejeon (KR); Gun Woo Moon, Daejeon (KR); Hong Sun Park, Daejeon (KR); Chol Ho Kim, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 350 days.

(21) Appl. No.: 12/738,346

(22) PCT Filed: Oct. 16, 2008

(86) PCT No.: PCT/KR2008/006107
§ 371 (c)(1),
(2), (4) Date: Apr. 16, 2010

(87) PCT Pub. No.: WO2009/051415
PCT Pub. Date: Apr. 23, 2009

(65) Prior Publication Data
US 2010/0231166 A1      Sep. 16, 2010

(30) Foreign Application Priority Data
Oct. 16, 2007 (KR) .......................... 10-2007-0104105

(51) Int. Cl.
*H02J 7/00* (2006.01)
(52) U.S. Cl. .......................... 320/118; 320/116; 320/119
(58) Field of Classification Search .................. 320/118, 320/116, 119
See application file for complete search history.

(56) References Cited

U.S. PATENT DOCUMENTS

| | | | |
|---|---|---|---|
| 5,504,415 A * | 4/1996 | Podrazhansky et al. | 320/118 |
| 5,659,237 A | 8/1997 | Divan et al. | |
| 5,869,950 A | 2/1999 | Hoffman, Jr. et al. | |
| 6,841,971 B1 * | 1/2005 | Spee et al. | 320/119 |
| 2006/0103350 A1 * | 5/2006 | Lai | 320/118 |
| 2006/0103351 A1 * | 5/2006 | Tanigawa et al. | 320/118 |
| 2007/0127274 A1 | 6/2007 | Bolz et al. | |
| 2007/0139006 A1 | 6/2007 | Yasuhito et al. | |
| 2007/0145946 A1 | 6/2007 | Chiang et al. | |
| 2009/0067200 A1 | 3/2009 | Bolz et al. | |

FOREIGN PATENT DOCUMENTS

| | | |
|---|---|---|
| EP | 0 432 639 B1 | 5/1995 |
| JP | 10-32936 A | 2/1998 |
| JP | 2004-194410 A | 7/2004 |
| KR | 1999-0037522 A | 5/1999 |
| KR | 10-2000-0057966 A | 9/2000 |
| KR | 2003-0080700 A | 10/2003 |
| KR | 2003-0096978 A | 12/2003 |

(Continued)

*Primary Examiner* — M'Baye Diao
(74) *Attorney, Agent, or Firm* — The Webb Law Firm

(57) ABSTRACT

A battery management system according to the present invention comprises a battery module consisted of a plurality of batteries connected in series; a switch module connected in parallel to the battery module; a voltage sensor measuring a voltage of each battery composing the battery module; a charge equalizer causing each battery composing the battery module to be charged, discharged or charged/discharged; and a microprocessor controlling the switch module to determine whether to charge or discharge each battery composing the battery module according to the voltage values measured by the voltage sensor and; wherein the voltage sensor and the charge equalizer are connected in parallel to each battery composing the battery module by the switch module.

18 Claims, 5 Drawing Sheets

FOREIGN PATENT DOCUMENTS

| KR | 10-2004-0017629 A | 2/2004 |
| KR | 10-2005-0004544 A | 1/2005 |
| KR | 10-2006-0061315 A | 6/2006 |
| KR | 10-2006-0083343 A | 7/2006 |
| KR | 10-2006-0087837 A | 8/2006 |
| KR | 10-2007-0006762 A | 1/2007 |
| KR | 10-2007-0030224 A | 3/2007 |
| KR | 10-2007-0031406 A | 3/2007 |
| KR | 10-2007-0064244 A | 6/2007 |
| KR | 10-0727002 B1 | 6/2007 |

* cited by examiner

[Figure 1]
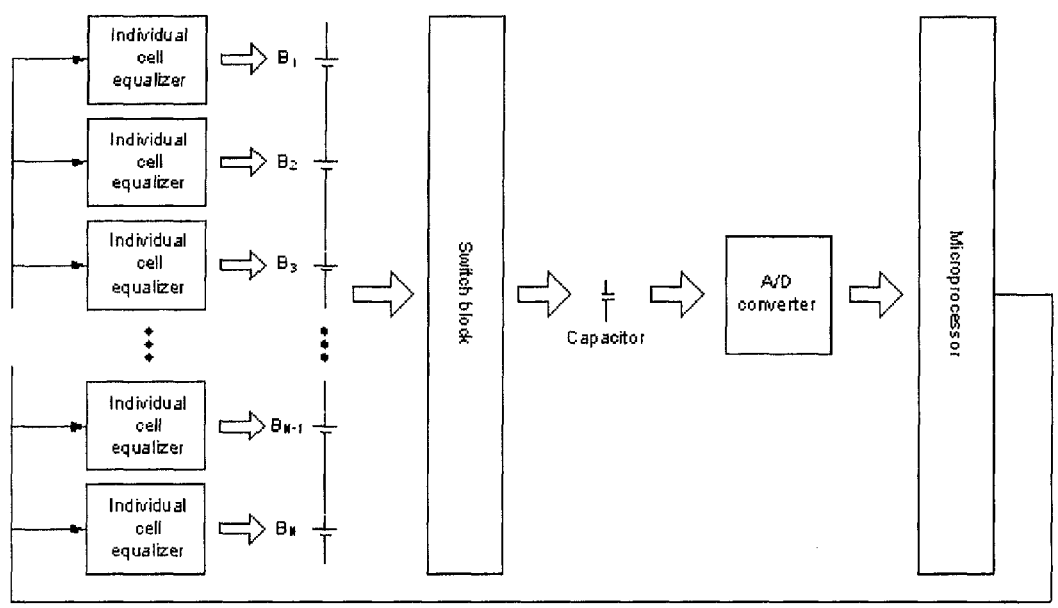

[Figure 2]
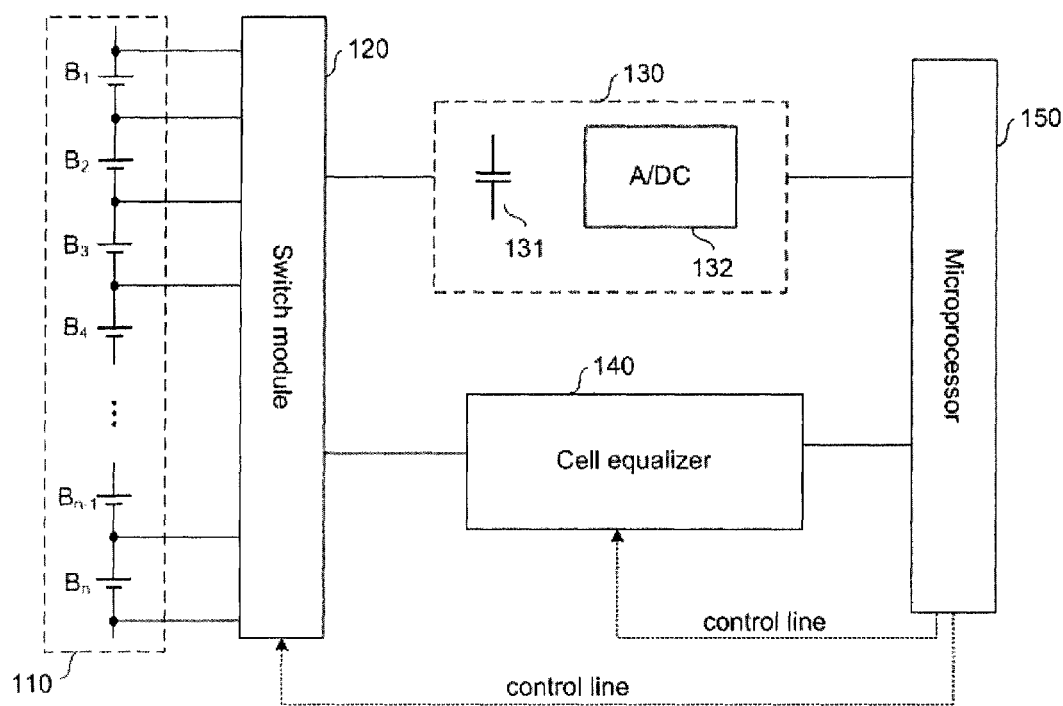

[Figure 3]
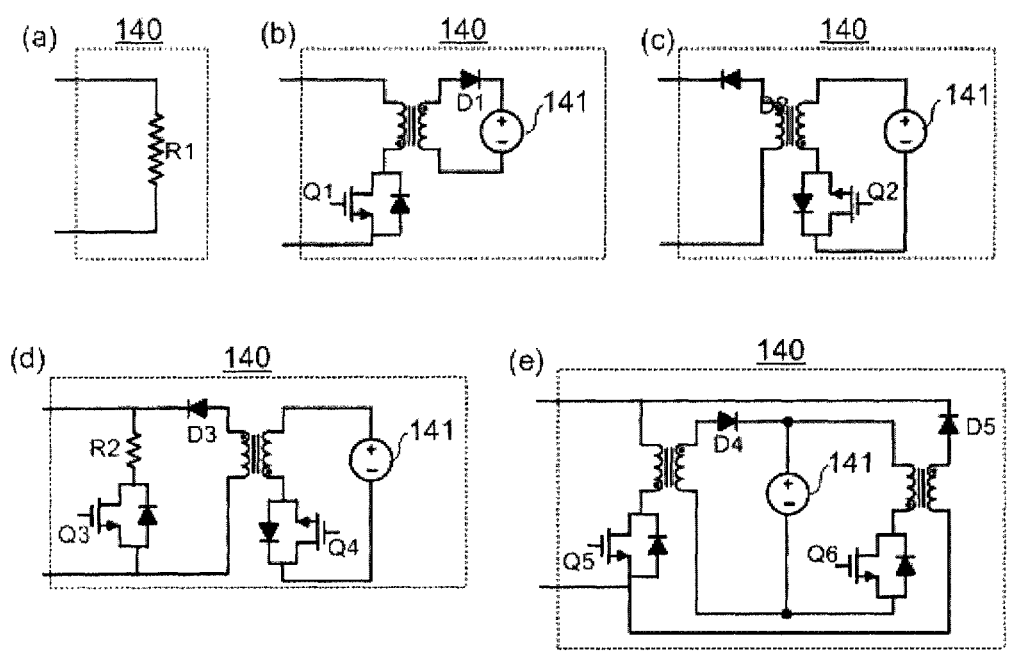

【Figure 4】
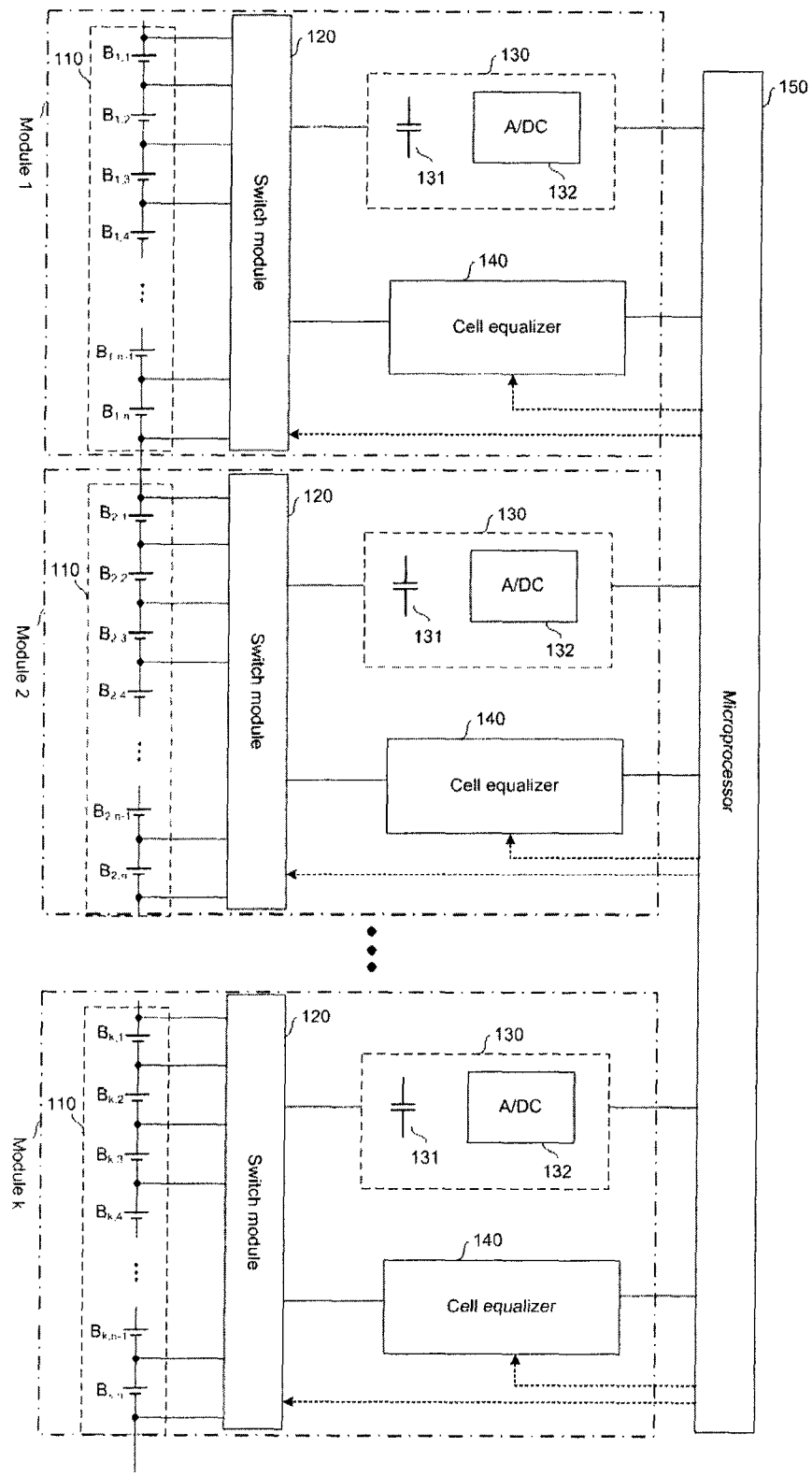

[Figure 5]
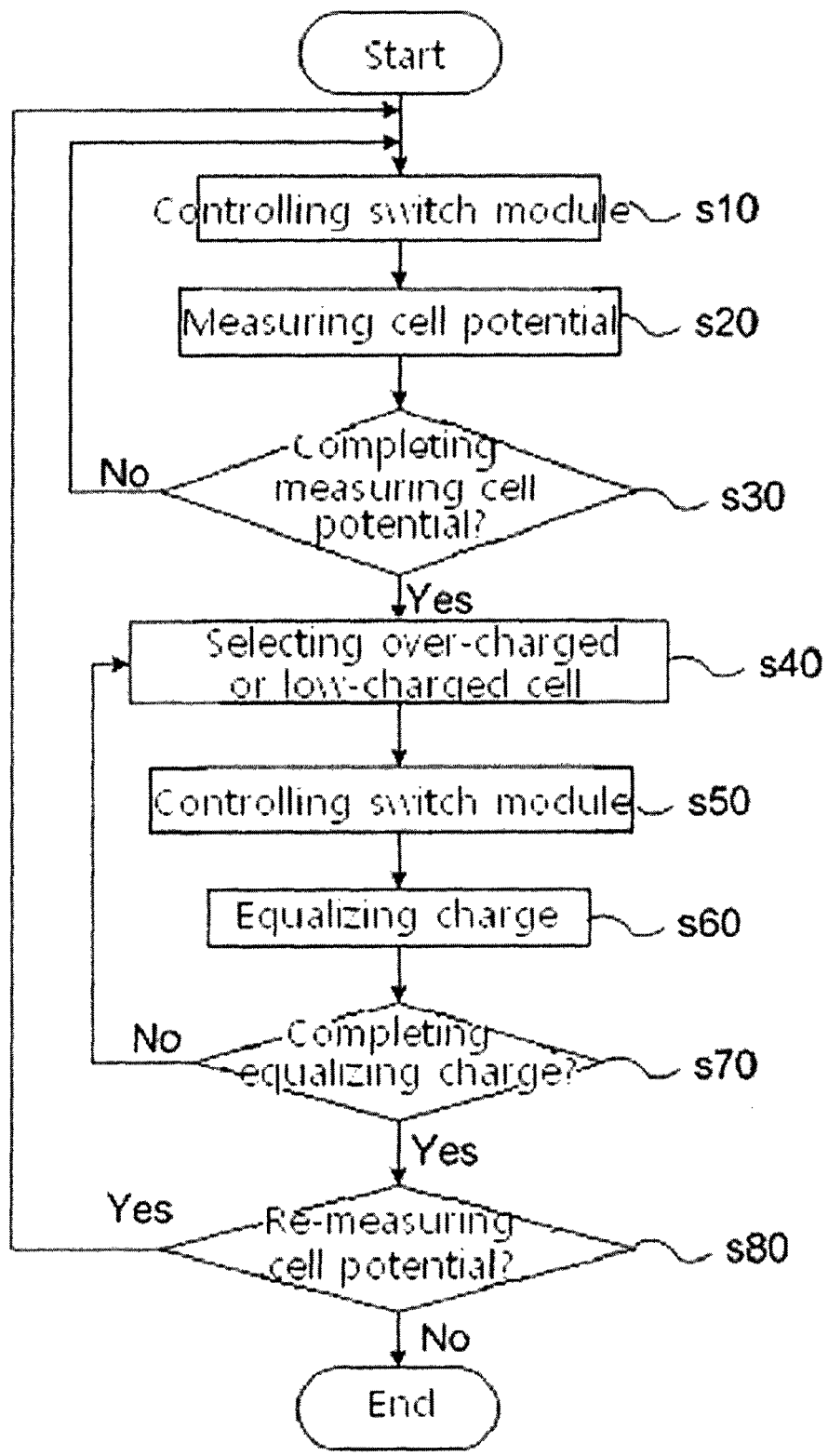

BATTERY MANAGEMENT SYSTEM WITH INTEGRATION OF VOLTAGE SENSOR AND CHARGE EQUALIZER

TECHNICAL FIELD

The present invention relates to a battery management system having a sensor for measuring voltage of a series-connected battery string integrated with a charge equalizer for assuring equalization of individual batteries (cell).

BACKGROUND ART

In a case that a potential higher than a basic potential of unit battery (cell) is necessary, such as a hybrid vehicle using a lithium ion cell as a power source, it is common to use a plurality of unit batteries which is connected in series. However, even though the batteries are produced with the same structure via a typical production method using the same anode, cathode and electrolyte material, a difference in charging or discharging (and self discharging) characteristics exists between each of the batteries connected in series.

Therefore, a potential difference can exist between the unit batteries when using the batteries connected in series. Even if one battery of the unit batteries connected in series is perfectly discharged regardless of a potential of other battery, a total voltage (total voltage of batteries connected in series) becomes zero so that the battery is need to be recharged. Upon recharging the battery, since the potentials of the batteries are different from one another, there is a problem of over-charging in that the battery may reach a prescribed voltage in advance, as well as a problem of charge inefficiency in that some batteries may not reach the prescribed voltage even in an existence of an over-charging.

Further, if the number of charging/discharging times becomes large, degradation is caused in materials composing the battery and thus a property of the battery is varied, and as a result, such degradation situation is responsible for further increasing a difference in individual cells.

In order to address such problems, there are proposed various charge equalization apparatuses which can accomplish charge equalization of the batteries connected in series.

As an example, Korean patent Laid-Open No. 2003-0096978 is directed to a system consisted of a plurality of unit cells, a charging means, a discharging means, series-parallel converting switch, wherein each of the plurality of unit cells is uniformly discharged and then charged by connecting the discharged unit cells in series. Korean Patent Laid-Open 2007-0064244 is directed to a system which comprises a cell unit, a field effect transistor unit connected to the cell unit, an amplifying unit connected to the field effect transistor unit, a multiplexer unit controlling an output signal of the amplifying unit, a comparing unit comparing a difference between voltage signals of the cell unit, an A/D converter converting the output of the comparer to a digital signal, a Micom unit inputting the signal outputted by the A/D converter and outputting the signal corresponding to charging/discharging condition, a switching unit operated according to a signal of the Micom unit to provide battery equalization current, and a known charging/discharging unit.

Further, Japanese Patent Laid-Open No. 1998-032936 is related to a system consisted of a plurality of unit cells, a means for detecting remaining capacity of each unit cell, charge and discharge replacing means for performing charging and discharging of each unit cell, a controller controlling charging and discharging of each unit cell, and direct current/direct current converter performing charging and discharging of each unit cell independently. Japanese Patent Laid-Open No. 2004-194410 is related to a system consisted of at least two unit cell groups, a means for detecting a difference between currents flowing each of a first cell group, and a second cell group, a means for controlling charging/discharging current of the cell group based on the current difference. U.S. Patent Laid-Open No. 2007-0145946 is related to a system comprising a plurality of unit cells, a charge equalization circuit having a DC-DC converter, and a control circuit for controlling a voltage of each cell by monitoring the voltage.

The prior technology can be represented as FIG. 1, which shows a battery management system having a voltage sensor separated from a cell equalizer. N batteries are connected in series and a switch block is located in a right side of the batteries. The switch block is responsible for selecting the specific battery (cell) to provide a next-stage capacitor and a current path. The potential stored in the capacitor is read in via an A/D converter, which is then input to a microprocessor. The battery voltage information inputted is used to operate the battery at the microprocessor. The microprocessor accomplishes charge equalization of total batteries by driving the charge equalizer connected in parallel to each of batteries, if the specific battery is low-charged or over-charged.

As shown in FIG. 1, prior battery management system having the voltage sensor separated from the cell equalizer has a disadvantage of larger volume, since each battery (cell) of the series-connected battery string has an individual charge equalizer (cell equalizer) of the same function, and also a switch module for reading-in voltage of each battery and a switch module for controlling the charge equalizer are separately provided as the voltage sensor. Further, it has a disadvantage that a voltage stress of the switch is increased as total series-connected battery string is controlled by the switch module.

DISCLOSURE

Technical Problem

An object of the present invention is to a battery management apparatus and method with a series-connected battery string having at least batteries connected in series, which can reduce a total volume of the battery management system by preventing each battery from having independent charge equalizer and sharing a limited charge equalizer in time-division manner to reduce a total volume of the charge equalizer, as well as by allowing each battery to share the switch module of the existing voltage sensor, and can overcome a voltage stress of a switch within a switch module which is expected to be higher if a total battery potential becomes higher as the number of the batteries connected in series is increased.

Technical Solution

A battery management system according to the present invention comprises a battery module consisted of a plurality of batteries connected in series; a switch module connected in parallel to the battery module; a voltage sensor measuring a voltage of each battery composing the battery module; a charge equalizer causing each battery composing the battery module to be charged, discharged or charged/discharged; and a microprocessor controlling the switch module to determine whether to charge or discharge each battery composing the battery module according to the voltage values measured by the voltage sensor; wherein the voltage sensor and the charge equalizer are connected in parallel to each battery composing the battery module by the same switch module.

The switch module is controlled by the microprocessor and one battery composing the battery module is connected in parallel to the voltage sensor in a time-division manner, and the switch module is controlled by the microprocessor and one battery composing the battery module is connected in parallel to the charge equalizer in a time-division manner.

The switch module is shared by voltage sensor and charge equalizer in time-division manner. Thus the switch module is used either for the voltage sensor or charge equalizer at one time. The switch module is used only for the voltage sensor during sensing the battery voltage and the switch module is used only for the charge equalizer during charge equalizing process.

Preferably, the voltage sensor comprises a capacitor and an A/D converter.

Preferably, the battery management system according to claim 3, wherein the switch module comprises a device capable of current bidirectional movement including a Field Effect Transistor (FET), Bipolar Junction Transistor (BJT) and a relay.

Preferably, the charge equalizer is a discharging circuit, charging circuit or charging/discharging circuit comprising an active element selected from a group consisted of a Field Effect Transistor, a Bipolar Junction Transistor, a relay and diode; and a passive element selected from a group consisted of an inductor, a transformer and a capacitor, and the charge equalizer comprises a charge-type DC/DC converter, a discharge-type DC/DC converter, or a combination thereof.

At this time, the charge-type DC/DC converter has a total potential of the battery module or an external energy storage apparatus as an input, and the discharge-type DC/DC converter has a total potential of the battery module or an external energy storage apparatus as an output.

Preferably, the charge equalizer is a discharging circuit comprising a resistor.

Preferably, the battery management system is consisted of at least two battery modules; and the switch module, the voltage sensor, and the charge equalizer are provided for each module.

A battery management method for a battery management system comprising a battery module consisted of a plurality of batteries connected in series; a switch module connected in parallel to the battery module; a voltage sensor measuring a voltage of each battery composing the battery module; a charge equalizer causing each battery to be charged, discharged or charged/discharged; and a microprocessor controlling the switch module, comprises steps of (a) inputting a voltage value of each battery to the microprocessor by connecting the battery to the voltage sensor using the switch module for a prescribed time, for each battery composing the battery module; and (b) connecting the charge equalizer to a single battery which is selected to be charged or discharged based on the voltage values inputted to the microprocessor using the switch module to charge or discharge the single battery.

At this time, the step (b) of the battery management method further comprises a step of selecting whether the charge equalizer performs charging or discharging via the microprocessor if the charge equalizer is a charge/discharge-type charge equalizer.

Preferably, the switch module is controlled in a time-division manner so that a voltage value of each battery composing the battery module is input to the microprocessor in the step (a).

Preferably, the switch module is controlled in a time-division manner so that the individual battery composing the battery module may be charged or discharged in the step (b).

Preferably, the input of the charge equalizer is connected to a total potential of the batteries connected in series or an external energy storage apparatus when charging the individual battery using the charge equalizer and the output of the charge equalizer is connected to a total potential of the batteries connected in series or an external energy storage apparatus when discharging the individual battery.

Preferably, the battery management system is constructed of at least two battery modules and the switch module, the voltage sensor and the charge equalizer are provided for each battery module, so that the step (a) and (b) is processed independently for each battery module.

The battery management system according to the present invention has an advantage that total volume thereof can be reduced, since the voltage sensor and the charge equalizer share the switch module used to select the individual battery (cell), each battery module is provided with a single charge equalizer, and each battery composing the module is connected to the charge equalizer by the switch module in a time-division manner to perform charge or discharge. Further, the present invention has an advantage that the voltage stress of the switch used in the switch module can be reduced by dividing total batteries connected in series into a unit of module and implementing the voltage sensor, the charge equalizer and the switch module for each module.

DESCRIPTION OF DRAWINGS

The above and other objects, features and advantages of the present invention will become apparent from the following description of preferred embodiments given in conjunction with the accompanying drawings, in which:

FIG. 1 is a structure diagram showing a prior battery management system having a series-connected battery string;

FIG. 2 is a diagram showing a structure example of a battery management system according to the present invention;

FIG. 3 is a diagram showing a structure example of a charge equalizer used in a battery management system according to the present invention;

FIG. 4 is a diagram showing other structure example of a battery management system according to the present invention;

FIG. 5 is a flow diagram showing a battery management method according to the present invention.

DETAILED DESCRIPTION OF MAIN ELEMENTS

110: battery module having at least two batteries connected in series
120: switch module 130: voltage sensor
140: charge equalizer 150: microprocessor Best Mode Hereinafter, a charge equalizing apparatus and method according to the present invention will be described in detail with reference to accompanying drawings. The accompanying drawings are provided as an example sufficiently to deliver an idea of the present invention to the person skilled in the art. Therefore, the present invention is not bounded by the drawings presented hereinafter but can be specified in another form. Further, like reference numerals denote like element throughout the following detailed description of the invention.

At this time, if the technological terms and science terms used herein do not have any other definition, they have meanings that can be typically understood by the person skilled in the art. Further, known functions and structures which can unnecessary make obscure the subject matter of the present invention in the following description and accompanying drawings will be omitted.

FIG. 2 is a diagram showing a structure example of a battery management system having a voltage sensor integrated with a charge equalizer according to the present invention. It has a battery module 110 having N batteries connected in series and a switch module 120 connected in parallel to each battery. The switch module 120 is responsible for selecting the specific cell and connecting it to the voltage sensor 130 during sensing a potential of the battery and also for connecting the specific cell which is low-charged or over-charged to the charge equalizer 140 during the charge equalization procedure. Therefore, the battery management system according to the present invention has a single voltage sensor 130 and a single charge equalizer 140 for one battery module 110. The microprocessor 150 controls the switch module 120 to measure a potential of each cell composing the battery module 110 via the voltage sensor 130, selects over-charged or low-charged cell, and controls the switch module 120 to connect the selected cell with the charge equalizer 140. Further, the microprocessor 150 controls the charge equalizer 140 to cause it to perform charging or discharging function, if the charge equalizer 140 is structured of a charge-type and a discharge-type. Such control function is shown as an arrow expressed by a dot line in FIG. 2 and FIG. 4.

The voltage sensor 130 can be used with a typical voltage measuring device to measure a potential of the cell. FIG. 2 shows an example of the voltage sensor 130 which measures a potential of the cell using a capacitor 131 connected in parallel to the individual cell and converts the potential of the capacitor into a digital value using an analog-to-digital converter (ADC) 132 to input it to the microprocessor 150. In other words, the potential of the battery is measured by reading the potential charged into the capacitor 131 via the analog-digital converter 132.

Further, the specific cell is connected in parallel to the charge equalizer 140 by the switch module 120, in which the charge equalizer 140 connected via the switch module 120 is responsible for charging or discharging the energy into or from the specific cell if the specific cell is low-charged or over-charged.

The charge equalizer 140 can be of a charge-type, a discharge-type or charge/discharge-type, as shown in FIGS. 3(a) to 3(e).

More specifically, the charge equalizer shown in FIG. 3(a) comprises a resistor. The charge equalizer accomplishes charge equalization in such a way that the corresponding cell is connected to a resistor R1 via the switch module 120 so that the energy is consumed from the over-charged specific cell to the resistor, if the specific cell is over-charged.

The charge equalizer shown in FIG. 3(b) is a discharge-type charge equalizer, and is implemented with a simple flyback converter even though any other DC/DC converter may be used. The discharge-type charge equalizer 140 has an input connected in parallel to an over-charged cell via the switch module 120 and an output connected to a total potential of battery pack (total potential of batteries connected in series) or an external energy storage apparatus. Specifically, if the specific cell is over-charged in the batteries connected in series, the corresponding cell is connected to an input of the charge equalizer 140 via the switch module 120 as shown in FIG. 3(b). In this case, if the switch Q1 is turned on, the energy flows out from the cell connected via the switch module 120 and then stored in a magnetizing inductor, and if the switch Q1 is turned off, the energy flows into the energy storage apparatus 141 (series-connected battery pack or external energy storage apparatus) pre-connected via a secondary-side rectifying diode D1.

The charge equalizer 140 shown in FIG. 3(c) is a charge-type charge equalizer, and can be implemented as a simple flyback converter, even though any other DC/DC converter can be used. The charge-type charge equalizer 140 has an input connected in parallel to a total potential of battery pack (total potential of the batteries connected in series) or an external energy storage apparatus and an output connected in parallel to any low-charged cell via the switch module 120. Specifically, if the switch Q2 is turned on, the energy flows out from the energy storage apparatus 141 (battery pack connected in series or other energy storage apparatus) pre-connected and stored in a magnetizing inductor of the transformer, and then if the switch Q2 is turned off, the energy passes through a secondary-side rectifying diode D2 and then flows into the corresponding cell connected via the switch module 120.

The charge equalizer 140 shown in FIG. 3(d) is a charge equalizer with energy-consumed (discharge-type) charge equalizer and charge-type charge equalizer being connected in parallel (parallel connection combination of FIG. 3(a) and FIG. 3(c)). In such charge equalizer, if the specific cell of the series-connected battery module is over-charged or low-charged, efficient charge equalization is possible. Specifically, if any cell in the series-connected battery module is over-charged or low-charged, the corresponding cell is connected in parallel to the charge equalizer 140 of FIG. 3(d). If the connected cell is over-charged, the charge equalization is accomplished in such a way that the switch Q3 is driven so that the energy is consumed in a resistor R2, and if the connected cell is low-charged, the charge equalization is accomplished by driving the charge-type charge equalizer. In a case that the charge-type charge equalizer is driven, if a switch Q4 is turned on, the energy flows out from the energy storage apparatus 141 (series-connected battery pack or other energy storage apparatus) pre-connected and then stored in a magnetizing inductor, and then if the switch Q4 is turned off, the energy flows into the corresponding cell via a secondary side rectifying diode D3.

The charge equalizer 140 shown in FIG. 3(e) is a charge equalizer with the discharge-type charge equalizer and the charge-type charge equalizer being connected in parallel. The charge equalizer 140 shown in FIG. 3(e) has efficient charge equalization performance if the specific cell of the series-connected battery module is over-charged or low-charged. If any cell in the series-connected battery module is over-charged, the corresponding cell is connected in parallel to the charge equalizer 140 of FIG. 3(e) via the switch module 120. If a switch Q5 is turned on, the energy flows out from over-charged cell and then stored in a magnetizing inductor, and then if the switch Q5 is turned off, the energy passes through a secondary-side rectifying diode D4 and flows into the energy storage apparatus 141 (series-connected battery pack or other energy storage apparatus) pre-connected. If the connected cell is low-charged, the charge equalization is accomplished by driving the charge-type charge equalizer. In this case, if a switch Q6 is turned on, the energy flows out from the energy storage apparatus 141 (series-connected battery pack or other energy storage apparatus) pre-connected and then stored in a magnetizing inductor, and then if the switch Q6 is turned off, the energy flows into the corresponding cell which is low-charged via a secondary-side rectifying diode D5.

FIG. 4 is a diagram showing other structure example of a battery management system having a voltage sensor 130 integrated with a charge equalizer 140, in which the voltage sensor 130 and the charge equalizer 140 are implemented in a unit of module 110 by dividing total series-connected battery string into k battery modules having n batteries connected in series in order to reduce a voltage stress of the switch module 120 (n and k are at least 2 independently with each other). Herein, the number (n) of batteries composing each module (module 1 to module k) is designed considering the voltage stress of the switch used in the switch module 120. The procedure of sensing the voltage within each module and equalizing the charge is the same as explained referring to FIG. 2 to FIG. 3. In the battery management apparatus shown in FIG. 4, since voltage measurement and charge equalization can be operated independently for each module, it is possible to simultaneously sense the voltage for the number of modules (k in a case of FIG. 4) or simultaneously equalize the charge for the specific cells which are over-charged or low-charged within the module.

The battery management method of the battery management system as described above comprises steps of (a) inputting a voltage value of each battery to the microprocessor by connecting the battery to the voltage sensor using the switch module for a prescribed time, for each battery composing the battery module; and (b) connecting the charge equalizer to a single battery which is selected to be charged or discharged based on the voltage values inputted to the microprocessor using the switch module to charge or discharge the single battery.

Specifically, as shown in a flow diagram of FIG. 5, the switch module 120 is controlled by a microprocessor 150 (s10) and the specific cell composing the battery module 110 and the voltage sensor 140 are connected for a prescribed time so that the potential of the specific cell is measured and input to the microprocessor 150 (s20). At this time, the potential measuring step (s20) can be carried out for each of all cells composing the battery module 110, or for only cells of certain section composing the module. This is determined by the microprocessor 150 based on a usage condition of total batteries connected in series and a charging/discharging condition (s30). At this time, the switch module is preferably controlled in a time-division manner for each of all cells composing the battery module 110 so that the potential of the cell is input to the microprocessor.

After the potential of the cell is measured (s30), the specific cell which is low-charged or over-charged is selected by the microprocessor 150 (s40). The switch module 120 is controlled to cause the selected cell to be connected in parallel to the charge equalizer 140 (s50) so that the selected cell is charged or discharged for a prescribed time (s60). Also, by selecting the specific cell which is over-charged or low-charged based on a potential of the cell pre-inputted by the microprocessor 150, it is determined to carry out the charge equalization (s70) or re-measure the potential of the cell (s80).

At this time, if the charge equalizer 150 is the charge/discharge-type charge equalizer, the charge equalization step (s60) is preferably performed after the step of controlling charge or discharge of the charge equalizer 150 is performed using the microprocessor 150.

In other words, the charge equalization step (s60) is preferably performed after a step of selecting whether the charge equalizer performs charging or discharging via the microprocessor if the charge equalizer is a charge/discharge-type charge equalizer.

The step (s10 and s20) of measuring a voltage value of the individual battery composing the battery module 110 and inputting it to the microprocessor 150 is preferably performed such that the switch module 120 is controlled by the microprocessor 150 in a time-division manner.

The charge equalizing step (s60) for the specific battery composing the battery module 110 which must be charged or discharged is preferably performed such that the switch module 120 is controlled in a time-division manner.

In the charge equalizing step (s60), the input of the charge equalizer 140 is connected to a total potential of the batteries connected in series or an external energy storage apparatus upon charging the individual battery using the charge equalizer 140 and the output of the charge equalizer 140 is connected to a total potential of the batteries connected in series or an external energy storage apparatus upon discharging it.

The battery management method according to the present invention is such that the battery management system is constructed of at least two battery modules and the switch module, the voltage sensor and the charge equalizer are provided for each battery module, so that the battery management method like steps of FIG. 5 can be processed independently for each battery module.

The battery management method according to the present invention can be implemented in a form of program commands which can be carried out via various computer means and stored in a computer-readable media. The computer-readable media can include a program command, a data file and a data structure, or a combination thereof. Even though the program command recorded in the media is specially designed and structured for the present invention, it may be any one known to a person skilled in related art of the computer software. As examples of the computer readable-recordable media, there are a magnetic media such as a hard disk, a floppy disc and a magnetic tape, an optical media such as CD-ROM DVD, a magneto-optical media such as a floptical disk, and hardware structured to store and execute the program command such as ROM, RAM and a flash memory. The media can be a transmitting media such as optic or metal line and waveguide including carrier wave transmitting a signal defining the program command, the data structure, and the like. As an example of the program command, there are machine language codes such as those made by a compiler, as well as higher class language codes which can be executed by a computer using an interpreter. The hardware device can be structured to be operated as at least one software module in order to perform the operation of the present invention, and vice versa.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A battery management system, comprising:
   a battery module including a plurality of batteries connected in series;
   a switch module connected in parallel to the battery module;
   a voltage sensor which measures a voltage of each battery included in the battery module;

a charge equalizer causing each battery included in the battery module to be charged, discharged or charged/discharged; and a microprocessor controlling the switch module to determine whether to charge or discharge each battery included in the battery module according to the voltage values measured by the voltage sensor, wherein the voltage sensor and the charge equalizer are connected in parallel to each battery included in the battery module by the same switch module.

2. The battery management system according to claim 1, wherein the switch module is controlled by the microprocessor and one battery included in the battery module is connected in parallel to the voltage sensor in a time-division manner.

3. The battery management system according to claim 2, wherein the switch module is controlled by the microprocessor and one battery included in the battery module is connected in parallel to the charge equalizer in a time-division manner.

4. The battery management system according to claim 1, wherein the voltage sensor comprises a capacitor and an A/D converter.

5. The battery management system according to claim 3, wherein the switch module comprises a device capable of current bidirectional movement including a Field Effect Transistor (FET), Bipolar Junction Transistor (BJT) or a relay.

6. The battery management system according to claim 1, wherein the charge equalizer is a discharging circuit, charging circuit or charging/discharging circuit comprising an active element selected from a group consisting of a Field Effect Transistor, a Bipolar Junction Transistor, a relay and diode; and a passive element selected from a group consisting of an inductor, a transformer and a capacitor.

7. The battery management system according to claim 6, wherein the charge equalizer comprises a charge-type DC/DC converter, a discharge-type DC/DC converter, or a combination thereof.

8. The battery management system according to claim 7, wherein the charge-type DC/DC converter has a total potential of the battery module or an external energy storage apparatus as an input.

9. The battery management system according to claim 7, wherein the discharge-type DC/DC converter has a total potential of the battery module or an external energy storage apparatus as an output.

10. The battery management system according to claim 1, wherein the charge equalizer is a discharging circuit comprising a resistor.

11. The battery management system according to claim 1, wherein the battery management system includes at least two battery modules; and the switch module, the voltage sensor, and the charge equalizer are provided for each module.

12. A battery management method for a battery management system comprising:
a battery module including a plurality of batteries connected in series; a switch module connected in parallel to the battery module; a voltage sensor measuring a voltage of each battery included in the battery module; a charge equalizer causing each battery to be charged, discharged or charged/discharged; and a microprocessor controlling the switch module, the method comprising the steps of:
(a) inputting a voltage value of each battery to the microprocessor by connecting the battery to the voltage sensor using the switch module for a prescribed time, for each battery included in the battery module; and
(b) connecting the charge equalizer to a single battery which is selected to be charged or discharged based on the voltage values inputted to the microprocessor using the switch module to charge or discharge the single battery.

13. The battery management method according to claim 12, wherein step (b) further comprises the step of selecting whether the charge equalizer performs charging or discharging via the microprocessor if the charge equalizer is a charge/discharge-type charge equalizer.

14. The battery management method according to claim 12, wherein the switch module is controlled in a time-division manner so that a voltage value of each battery included in the battery module is input to the microprocessor in step (a).

15. The battery management method according to claim 12, wherein the switch module is controlled in a time-division manner so that the individual battery included in the battery module may be charged or discharged in step (b).

16. The battery management method according to claim 12, wherein the input of the charge equalizer is connected to a total potential of the batteries connected in series or an external energy storage apparatus when charging the individual battery using the charge equalizer and the output of the charge equalizer is connected to a total potential of the batteries connected in series or an external energy storage apparatus when discharging the individual battery.

17. The battery management method according to claim 12, wherein the battery management system is comprised of at least two battery modules, and wherein the switch module, the voltage sensor and the charge equalizer are provided for each battery module, so that step (a) and (b) are processed independently for each battery module.

18. A non-transitory computer-readable recording media that stores a program for executing the battery management method according to claim 12.

* * * * *